March 3, 1959  E. H. SCHULTZ, JR  2,875,625
FLAT BELT PULLEY
Filed Feb. 15, 1956
2 Sheets-Sheet 1
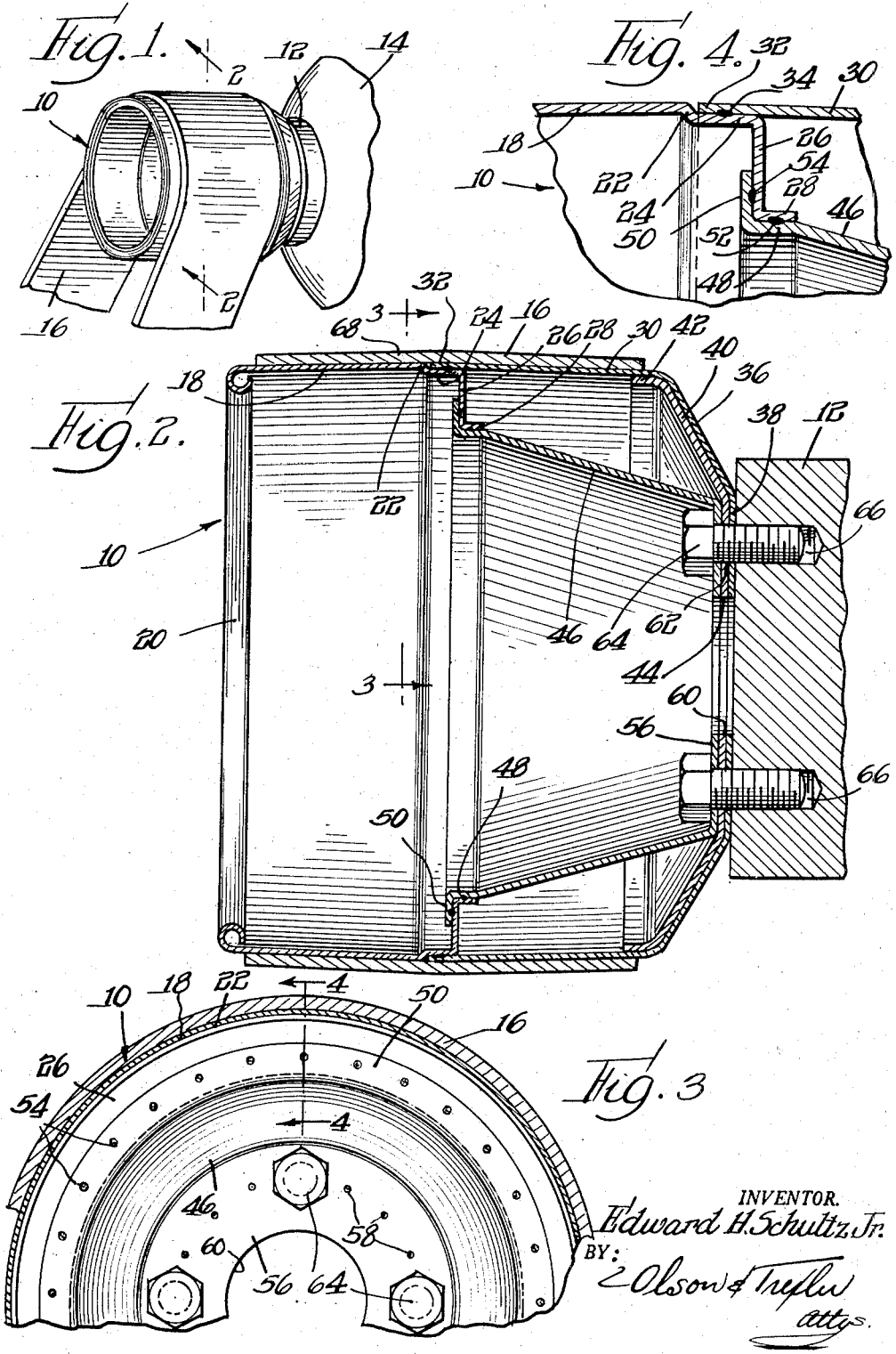
INVENTOR.
Edward H. Schultz Jr.
BY Olson & Trexler
attys.

March 3, 1959
E. H. SCHULTZ, JR
2,875,625
FLAT BELT PULLEY
Filed Feb. 15, 1956
2 Sheets-Sheet 2
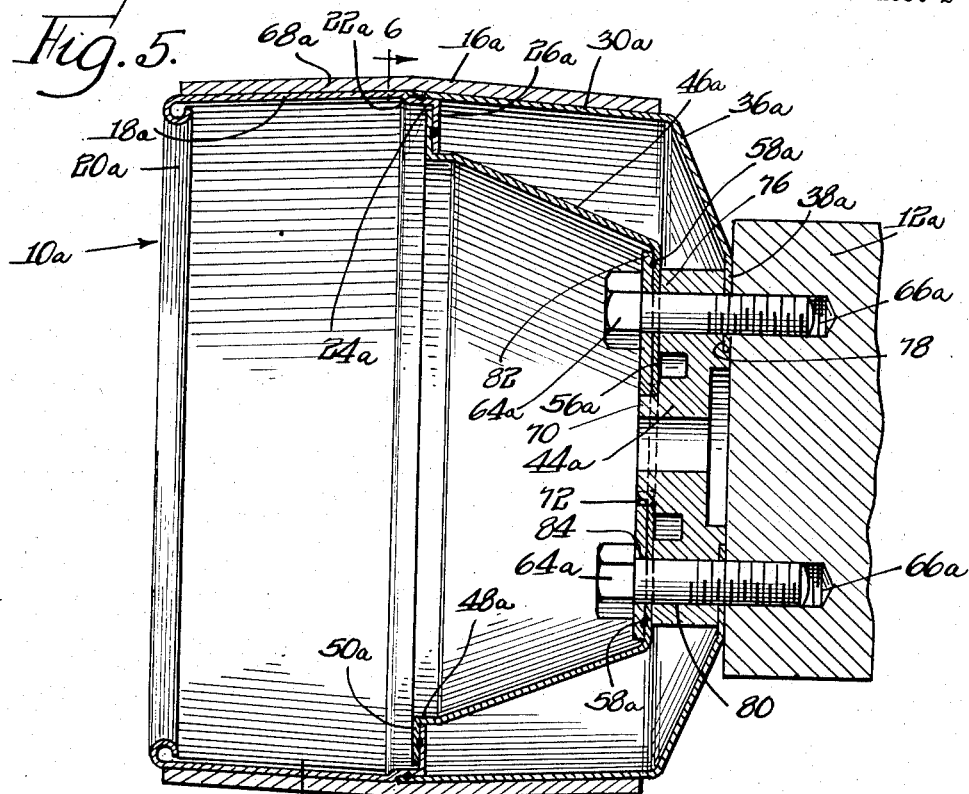
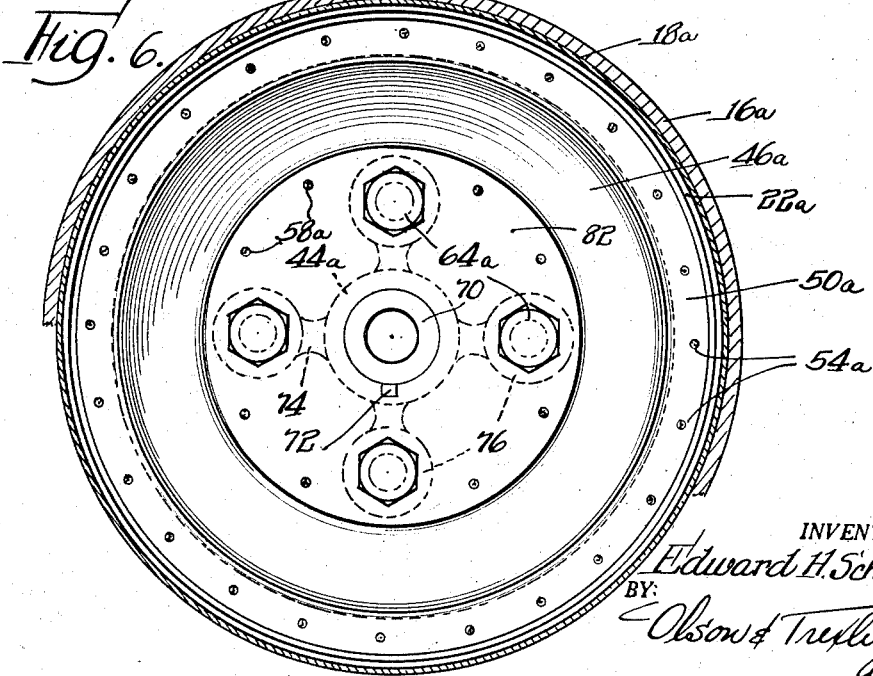
INVENTOR.
Edward H. Schultz, Jr.
BY:
Olson & Trexler
attys.

United States Patent Office 2,875,625
Patented Mar. 3, 1959

2,875,625

FLAT BELT PULLEY

Edward H. Schultz, Jr., Chicago, Ill., assignor to The Nagel-Chase Mfg. Co., Chicago, Ill., a corporation of Illinois Application February 15, 1956, Serial No. 565,622

8 Claims. (Cl. 74—230.8)

This invention is concerned with a sheave or pulley of the flat belt type.

Pulleys and drive belts quite frequently are used for interconnecting power sources and driven devices. For relatively small magnitudes of power transfer the pulleys are provided with circumferential grooves receiving a V-belt. For transmission of greater power it is common to use flat belts having rather broad lateral or transverse dimensions. Such belts are passed over pulleys having generally cylindrical outer surfaces, and such pulleys may or may not be slightly crowned adjacent the center. Flat belt pulleys as generally used heretofore in the prior art have practically universally been made of cast iron in order to provide the requisite strength at a reasonable cost. These pulleys have been quite heavy. The weight of such cast iron pulleys in many instances has been extremely undesirable, particularly for use in portable installations. The rather substantial weight of such cast iron pulleys also has imparted a rather high inertia thereto. Such high inertia in many instances is not desirable. Furthermore, and as is well known, cast iron is subject to fracture upon being struck a sharp blow. In many applications it is extremely unlikely that a pulley would be struck with such a blow, but it is a factor to be considered, particularly in portable equipment, including the use of such a pulley on the power take-off of a farm tractor.

It is an object of this invention to provide a flat belt pulley or sheave obviating the difficulties noted above.

More specifically, it is an object of this invention to provide a flat belt pulley which is light in weight and which has the requisite strength, and which, furthermore, is extremely economical to produce.

More specifically, it is an object of this invention to provide a flat belt pulley made of sheet metal.

Other and further objects and advantages of the present invention will be apparent from the following description when taken in connection with the accompanying drawings wherein:

Fig. 1 is a perspective view of a pulley constructed in accordance with this invention and having a flat belt passed thereover;

Fig. 2 is a longitudinal sectional view taken substantially along the line 2—2 of Fig. 1;

Fig. 3 is a cross sectional view taken substantially along the line 3—3 in Fig. 2;

Fig. 4 is an enlarged longitudinal sectional view of a fragment of the pulley as taken substantially along the line 4—4 of Fig. 3;

Fig. 5 is a longitudinal sectional view similar to Fig 2 showing a modified form of the pulley; and Fig. 6 is a cross sectional view of the modified pulley as taken substantially along the lines 6—6 in Fig. 5.

Referring now more particularly to the drawings, and first to Figs. 1-4, there is shown a flat belt pulley 10 mounted on the end of a shaft 12 associated with either a driving or a driven device 14. In the present instance the pulley is shown of being of rather small diameter compared with the shaft 12. It will be appreciated that this usually is the case with a driving pulley when it is desired to increase the force and reduce the speed at the driven device. Thus, the device 14 preferably is taken as a driving device such as an electric motor or other engine or power source, but it is to be understood that the pulley also could be used with a driven device. A flat belt 16 of conventional type and of any suitable or known material is passed over the pulley.

The pulley as shown in Figs. 1-4 is comprised entirely of sheet metal. Thus, an outer drum 18 forms half of the belt bearing surface and is made of sheet metal, having a rolled over edge 20 for strength and rigidity. The drum 18 preferably is of slightly less diameter at the edge having the rolled over section 20 than it is at the opposite edge forming the center of the belt bearing surface. This provides a slight crown to the belt bearing surface which helps to keep the belt centralized thereon, and resists slipping of the belt from the pulley.

Adjacent the edge of the drum 18 opposite to the rolled over edge 20 the drum is set inwardly to form a shoulder 22 having a generally cylindrical section 24 projecting therefrom. The cylindrical section 24 is terminated by a flange 26 extending radially inwardly and having a cylinder 28 of smaller diameter at its inner edge projecting away from the drum 18.

The pulley includes an inner drum 30 fitting at one edge over the cylindrical portion 24 as at 32 so that the adjacent edges of the two drums are in mating relationship. The edge portion 32 and the cylindrical portion 24 are spot welded together at 34 at spaced positions about the circumference thereof. The outside diameter of the drum 30 at the edge 32 is the same as the outside diameter of the adjacent portion of the drum 18, and the drum 30 preferably tapers slightly to a lesser diameter moving away from this edge in a symmetrical manner relative to the drum 18. At the opposite edge of the drum 30 there is provided a frusto-conical section 36 terminating in a radially inwardly directed flange 38 provided with bolt holes as hereinafter will appear. The frusto-conical section 36 is reinforced with a sheet metal frusto-conical brace 40 complementary in shape to the section 36 and held against the inner surface thereof. The brace 40 is provided with a cylindrical flange 42 at its outer edge underlying the drum 30, and with a radially inwardly directed flange 44 lying against the flange 38.

The pulley also includes a frusto-conical strut 46 of much shallower taper than the section 36 and brace 40. The frusto-conical strut 46 is provided at its larger end with a short cylindrical section 48 received within the cylindrical flange 28, and with a radially outwardly directed flange 50 fitting against the outer surface of the radial flange 26. The cylindrical sections 28 and 48 are spot welded together as at 52, while the radial flanges 26 and 50 are spot welded together as at 54, it being understood that these spot welds are spaced circumferentially about the respective parts. It is of considerable importance that the flange 50 lies against the outer surface of the flange 26, rather than vice versa. The opposite or smaller diameter end of the frusto-conical strut 46 is provided with a radially inwardly directed flange 56. The flange 46 fits against the brace flange 44, and this in turn fits against the drum flange 38. The three flanges are spot welded together as at 58, the welds being arranged in spaced relation annularly of the flanges.

The three flanges 38, 44, and 56 are provided with a central aperture 60 of common diameter which may be utilized for centering the pulley if so desired, and also are provided with a plurality of bolt holes 62 extending through the three flanges. There may be any suitable number of bolt holes, four being the illustrative example, and bolts 64 are passed through these bolt holes and tapped into suitable bores 66 in the end of the shaft 12 to mount the pulley on the shaft.

It will be apparent that the symmetrically tapered construction of the drums 18 and 30 provides a belt bearing surface 68 of crowned construction. The pulley is well reinforced by the frusto-conical portion 36 and the frusto-conical brace 40. More particularly, the frusto-conical strut 46 provides reinforcement at the center. It will be appreciated that the frusto-conical strut cannot deform in one portion unless it is subjected to such an extremely great strain as to cause it to deform completely. The strut also, by virtue of the flange 50 fitting on the outside surface of the flange 26, clamps the drum 18 toward the drum 30 upon tightening of the bolts 64. Thus, although the various spot welds 34, 54, 52, and 58 serve to hold the parts together and to prevent any tendency of any of the parts to rotate relative to one another, the parts are effectively held together when on the end of the shaft even if the spot welds were to be omitted. This provides a very desirable reinforcement. The rolled over edge 20 also provides reinforcement for the pulley as readily will be understood.

A modified form of the invention is shown in Figs. 5 and 6. The parts in the modification either are similar to, or are analogous to the parts heretofore described for the most part. Accordingly, to obviate the necessity of extended description such similar or analogous parts are identified by the same reference numbers as used heretofore with the addition of the suffix a. Thus, the drums 18a and 30a remain substantially identical with those previously described. The only difference is that the radial flange 26a on the drum 18a lacks a cylindrically projecting flange. The frusto-conical strut is substantially the same as previously described, but is of somewhat shorter axial extent and of more pronounced taper. As a result, the radially extending flange 56a on the strut is spaced from the radially extending flange 38a.

In place of the brace 40 in the previous embodiment of the invention along with its radially extending flange there is provided a spider 44a. This spider is provided with a central hub 70 projecting through the central aperture of the flange 56a and keyed thereto as at 72. A plurality of arms 74 extends radially outwardly from the hub 70. There are four such arms in the illustrative embodiment, and each arm is provided at its outer extremity with a boss 76. The bosses are recessed at the surfaces confronting the shaft 12a as is indicated at 78 to accommodate the flange 38a of the drum 30a. Each boss is provided with an axially extending bore 80.

A ring 82 is positioned flat against the front of the flange 56a of the strut and is spot welded thereto at 58a, the spot welds being spaced annularly. The ring is provided with a plurality of spaced apertures 84 aligned with the spider bores 80, and similar apertures in the flanges 56a and 38a provide for passage of the bolts 64a threaded into the tapped apertures 66a in the end of the shaft 12a.

The embodiment of the invention shown in Figs. 5 and 6 is in some instances desirable, but it is to be understood that the embodiment of Figs. 1–4 is the preferred embodiment inasmuch as only sheet metal is utilized, cast parts being completely eliminated. In each instance it will be appreciated that the relative orientation of the parts is such that all of the parts are clamped together when the bolts are threaded into the tapped apertures in the end of the shaft. Thus, the clamping force augments the spot welds in holding the parts together.

It is to be understood that the specific embodiments of the invention herein shown and described are exemplary only. It is within the contemplation of the invention that the pulley in some instances could be made of sheet material other than metal, and it is to be understood that this is within the purview of the invention. Other changes which might occur to those skilled in the art are to be understood as forming a part of this invention insofar as they fall within the spirit and scope of the appended claims.

I claim:

1. A pulley comprising a sheet material member having an annular belt engaging surface and attachment means thereon, a second sheet material member having an annular belt engaging surface thereon and further having attachment means, means holding said two members together with said annular belt engaging surfaces positioned adjacent one another for simultaneously engaging a belt, at least one of said attachment means extending radially inwardly beyond the other, and diagonal strut means extending between said attachment means for bracing said pulley.

2. A pulley as set forth in claim 1 wherein the strut means comprises a substantially frusto-conical sheet material member.

3. A pulley as set forth in claim 2 wherein the frusto-conical sheet material member is provided with means radially overlapping one of said attachment means for axially urging the annular belt engaging surface members together.

4. A pulley as set forth in claim 3 wherein the attachment means on the second belt engaging member includes an inwardly extending frusto-conical portion, and further including a brace in surface engagement with said frusto-conical portion and extending therebeyond, said frusto-conical strut means engaging said brace.

5. A pulley as set forth in claim 3 wherein the attachment means on the second belt engaging member comprises a sheet metal portion extending inwardly and having a substantially frusto-conical shape terminated by a radially inwardly extending flange, wherein the frusto-conical strut means is provided at the corresponding end with a radially inwardly directed flange, means spacing said radially inwardly directed flanges apart, and means holding said radially inwardly directed flanges and said spacing means in assembled relation.

6. A flat belt pulley comprising inner and outer sheet material members each having a substantially cylindrical peripheral section with the adjacent edges thereof disposed in mating relationship, strut means adjacent the inner edge of the outer sheet material member extending diagonally inwardly with a relatively shallow taper with respect to the peripheral sections, strut means at the edge of the inner sheet material member remote from the mating edges and extending diagonally inwardly with a relatively steep taper with respect to the first-mentioned strut means, both of said strut means extending in the same direction with the strut means of relatively shallow taper extending within and traversing the peripheral section of the inner sheet material member and extending within the strut means of relatively steep taper, and means holding the inner portions of both said strut means together with said peripheral sections forming a substantially continuous and generally cylindrical belt engaging section.

7. A flat belt pulley as claimed in claim 6, wherein each of said strut means comprises a substantially frusto-conical section of sheet material.

8. A flat belt pulley as claimed in claim 6, wherein said peripheral sections are frusto-conical with a very shallow taper in opposite directions from a maximum diameter at the mid-portion of the belt engaging section.

References Cited in the file of this patent

UNITED STATES PATENTS

| | | |
|---|---|---|
| 1,017,152 | Johnson | Feb. 13, 1912 |
| 2,092,571 | Cole | Sept. 7, 1937 |
| 2,680,380 | Bagley | June 8, 1954 |

FOREIGN PATENTS

| | | |
|---|---|---|
| 380,197 | Great Britain | Sept. 15, 1932 |